(12) United States Patent
Koch et al.

(10) Patent No.: US 7,995,732 B2
(45) Date of Patent: Aug. 9, 2011

(54) MANAGING AUDIO IN A MULTI-SOURCE AUDIO ENVIRONMENT

(75) Inventors: Robert Koch, Norcross, GA (US); Robert Starr, Decatur, GA (US); Steven Tischer, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 972 days.

(21) Appl. No.: 11/867,177

(22) Filed: Oct. 4, 2007

(65) Prior Publication Data
US 2009/0094029 A1    Apr. 9, 2009

(51) Int. Cl.
*H04M 3/42* (2006.01)
(52) U.S. Cl. .............................. 379/204.01; 379/202.01
(58) Field of Classification Search . 379/202.01–205.01
See application file for complete search history.

(56) References Cited

U.S. PATENT DOCUMENTS

| | | | |
|---|---|---|---|
| 5,539,741 A * | 7/1996 | Barraclough et al. | 370/267 |
| 6,304,648 B1 * | 10/2001 | Chang | 379/202.01 |
| 6,888,935 B1 * | 5/2005 | Day | 379/202.01 |
| 6,931,113 B2 * | 8/2005 | Ortel | 379/202.01 |
| 7,065,198 B2 * | 6/2006 | Brown et al. | 379/202.01 |
| 7,266,189 B1 * | 9/2007 | Day | 379/202.01 |
| 7,522,719 B2 * | 4/2009 | Carlson et al. | 379/202.01 |

* cited by examiner

*Primary Examiner* — David R Hudspeth
*Assistant Examiner* — Samuel G Neway
(74) *Attorney, Agent, or Firm* — Hope Baldauff Hartman, LLC (57) ABSTRACT

Methods, systems, and computer-readable media provide for the management of an audio environment with multiple audio sources. According to various embodiments described herein, real-time audio from multiple sources is received. A speaker is identified for each of the audio sources. Upon detecting a change from a first audio source to a second audio source, an identification of the speaker associated with the second audio source is provided. According to various embodiments, a recording of the real-time audio may be made and descriptors inserted to identify each speaker as the audio source changes. Real-time feedback from the speakers regarding characteristics of the audio may be received and corresponding adjustments to the audio made.

16 Claims, 7 Drawing Sheets

MANAGING AUDIO IN A MULTI-SOURCE AUDIO ENVIRONMENT

TECHNICAL FIELD

This application relates generally to the field of managing audio content. More specifically, the disclosure provided herein relates to the management of an audio environment having multiple audio sources.

BACKGROUND

Conference calls and meetings are common practices throughout many types of businesses all over the world. A typical conference call may include multiple telephone lines corresponding to multiple business locations. At each business location, there may be multiple speakers in the room, each contributing to the conversation. When participating in a conference call, it may be difficult to identify the person that is speaking at any given time. This is particularly true when there are a large number of call participants and when the call participants are not all familiar with one another. Additionally, there is often a wide range of volume and audio quality levels associated with various call participants and telephone lines.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer-readable media are provided herein for managing audio from multiple sources. According to embodiments described herein, audio is received in real-time from multiple audio sources. A speaker associated with each of the audio sources is identified. When a change from an audio source to a new audio source is detected, an identification of the speaker associated with the new audio source is provided. According to various embodiments, an audio recording of the real-time audio is created. The audio recording may include descriptors identifying each speaker when a change in audio source is detected. The descriptors may be used to identify the current speaker and by a search engine to locate requested audio portions from a repository. Additionally, real-time feedback from the speakers regarding characteristics of the audio may be received and corresponding adjustments to the audio made.

Other apparatus, systems, methods, and/or computer program products according to embodiments will be or become apparent to one with skill in the art upon review of the following drawings and Detailed Description. It is intended that all such additional apparatus, systems, methods, and/or computer program products be included within this description, be within the scope of the present invention, and be protected by the accompanying claims.

DETAILED DESCRIPTION

The following detailed description is directed to methods, systems, and computer-readable media for managing audio content having multiple audio sources. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

As discussed briefly above, recognizing the identity of the current speaker during a conference call can be difficult. This is particularly true when the speaker is just one of multiple call participants in a single location utilizing a speaker phone. When utilizing a speaker phone, call participants may be located at various distances from the phone and speak at different volume levels, creating inconsistencies in the audio volume coming from the telephone line associated with the speaker phone. Adding to the audio problems associated with the speaker phone, speaker phones generally pick up ambient noises within the room in addition to the speaker's voice, creating additional audio volume and quality problems.

Embodiments of the disclosure described herein allow for the identification of the current speaker in a conference call scenario. Additionally, embodiments allow for call participants to modify the volume and/or audio quality of the audio associated with any particular speaker during the call. A recording made of the conference call is tagged with descriptors that identify the current speaker and track various audio characteristics, including all modification requests and subsequent modifications to the audio associated with each speaker. The descriptors may be used by a search engine, allowing a user to search for and retrieve audio content corresponding to particular speakers. The descriptors additionally may be used to analyze audio content and create statistical data and related reports. It should be appreciated that for illustrative purposes, the disclosure presented herein describes the various embodiments in the context of a conference call. However, the present disclosure may be applied to any audio source or sources that contain multiple speakers, including but not limited to radio broadcasts, meetings, recorded audio, and any other media.

Figure 1:
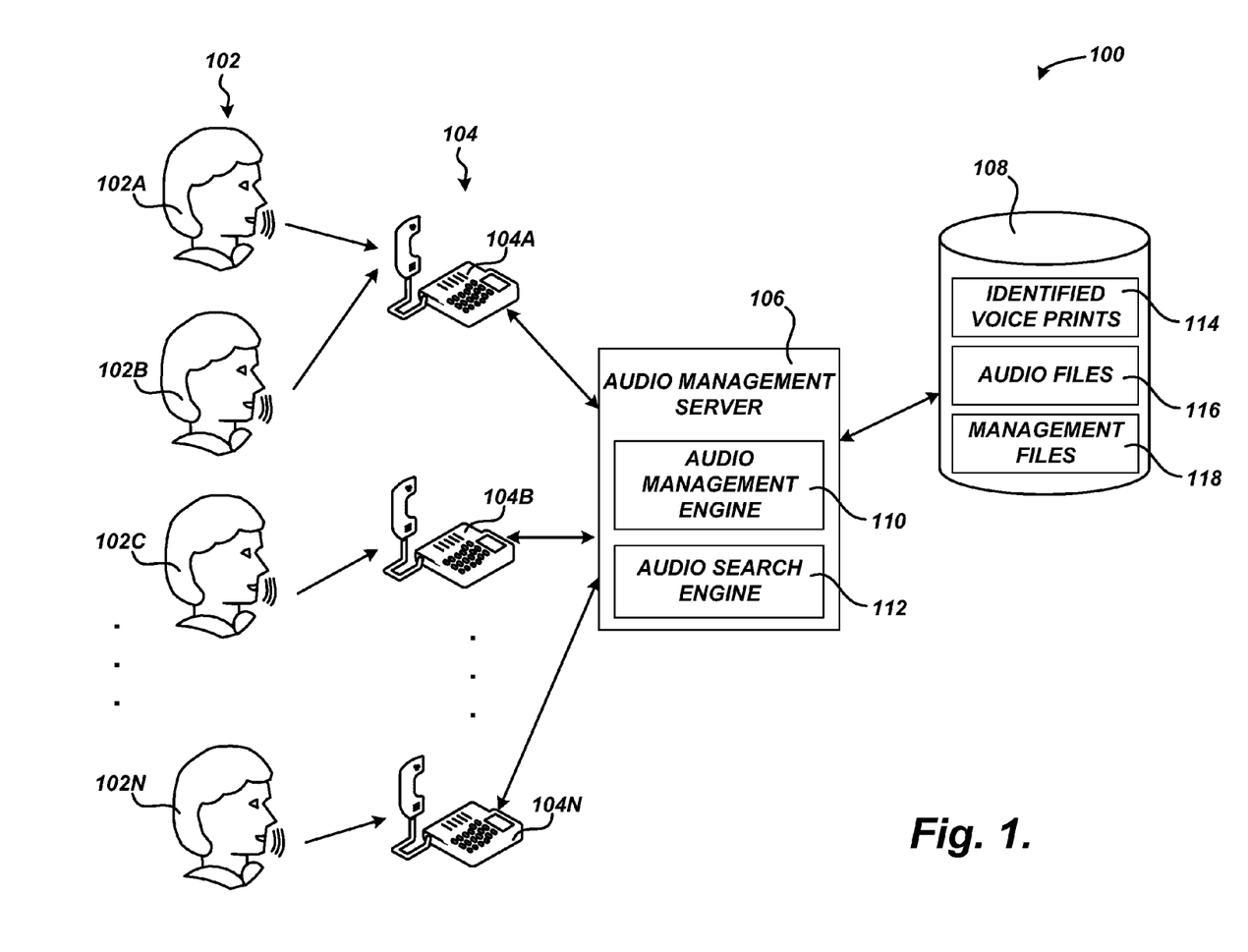
FIG. 1 is a block diagram showing elements of an audio management system according to various embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of an audio management system will be described. FIG. 1 shows various elements of an audio management system 100 according to embodiments described herein. The audio management system 100 includes speakers 102A-102N, communications devices 104A-104N, an audio management server 106, and an audio repository 108.

Each speaker 102 creates audio that is received by one or more communications device 104. Each communications device 104 includes a microphone for receiving the audio from one or more speaker 102. It should be appreciated that each communications device 104 may be any device capable of receiving audio from a speaker 102 and providing the audio to an audio management engine 110 within the audio management server 106. The communications devices 104A-104N may provide the audio to the audio management server 106 directly, or via telecommunications equipment. In the example audio management system 100 shown in FIG. 1, the communications devices 104A-104N are wired telephones. In this example, the audio management server 106 would receive the audio from an element of a telecommunications network. Other examples of communication devices 104A-104N include, but are not limited to cellular telephones, digital and tape recorders, and microphones connected directly to the audio management server 106. Additionally, as will be described in greater detail below with respect to FIG. 2, each communications device 104 may include more than one microphone for receiving audio.

The audio management server 106 includes the audio management engine 110 and an audio search engine 112. The audio management engine 110 may include software and/or hardware and is operative to identify the speakers 102A-102N and further manipulate the corresponding audio in the various manners described below. While the audio management engine 110 is shown to be executing on the audio management server 106, the audio management engine 110 may alternatively execute on one or more of the communications devices 104A-104N, or in combination with an application on one or more of the communications devices 104A-104N. The audio search engine 112 is responsive to user requests for audio data stored within the audio repository 108. As will be described in greater detail below with respect to FIG. 4, the audio search engine 112 is operative to search for and retrieve partial or whole audio files 116 and management files 118, according to descriptors placed within the audio files 116 and management files 118 by the audio management engine 110.

The audio repository 108 may be a database or other mass storage device communicatively linked to the audio management server 106. It should be appreciated that the audio repository 108 may be a part of the audio management server 106, or may be locally or remotely connected to the audio management server 106. The audio repository 108 includes identified voice prints 114, audio files 116 and management files 118. The identified voice prints 114 may include voice samples, as well as spectrograms or other voice analysis results corresponding to the speakers 102A-102N. As will be described in detail below, the identified voice prints 114 are used by the audio management engine 110 to recognize and/or identify the speakers 102A-102N through voice print comparison and formant analysis or other voice print analysis techniques.

The audio files 116 include audio recordings and portions of audio recordings. Each time a teleconference, meeting, or other multi-speaker audio environment is recorded, the audio management engine 110 stores the recording in the audio files 116. Similarly, whenever any recording is manipulated to include descriptors or to enhance any portion of the associated audio, the modified audio recording is stored in the audio files 116. The management files 118 include any data related to the analysis and manipulation of the audio files 116, including raw data, statistics, and reports. Examples of the management files 118 and corresponding uses for the management files 118 will be given below.

It should be understood that the various elements of the audio management system 100 may communicate with one another via a network. The network may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. The network may also be a wired network such as, but not limited to, a wired Wide Area Network (WAN), a wired Local Area Network (LAN) such as the Ethernet, a wired Personal Area Network (PAN), or a wired Metropolitan Area Network (MAN).

Figure 2:
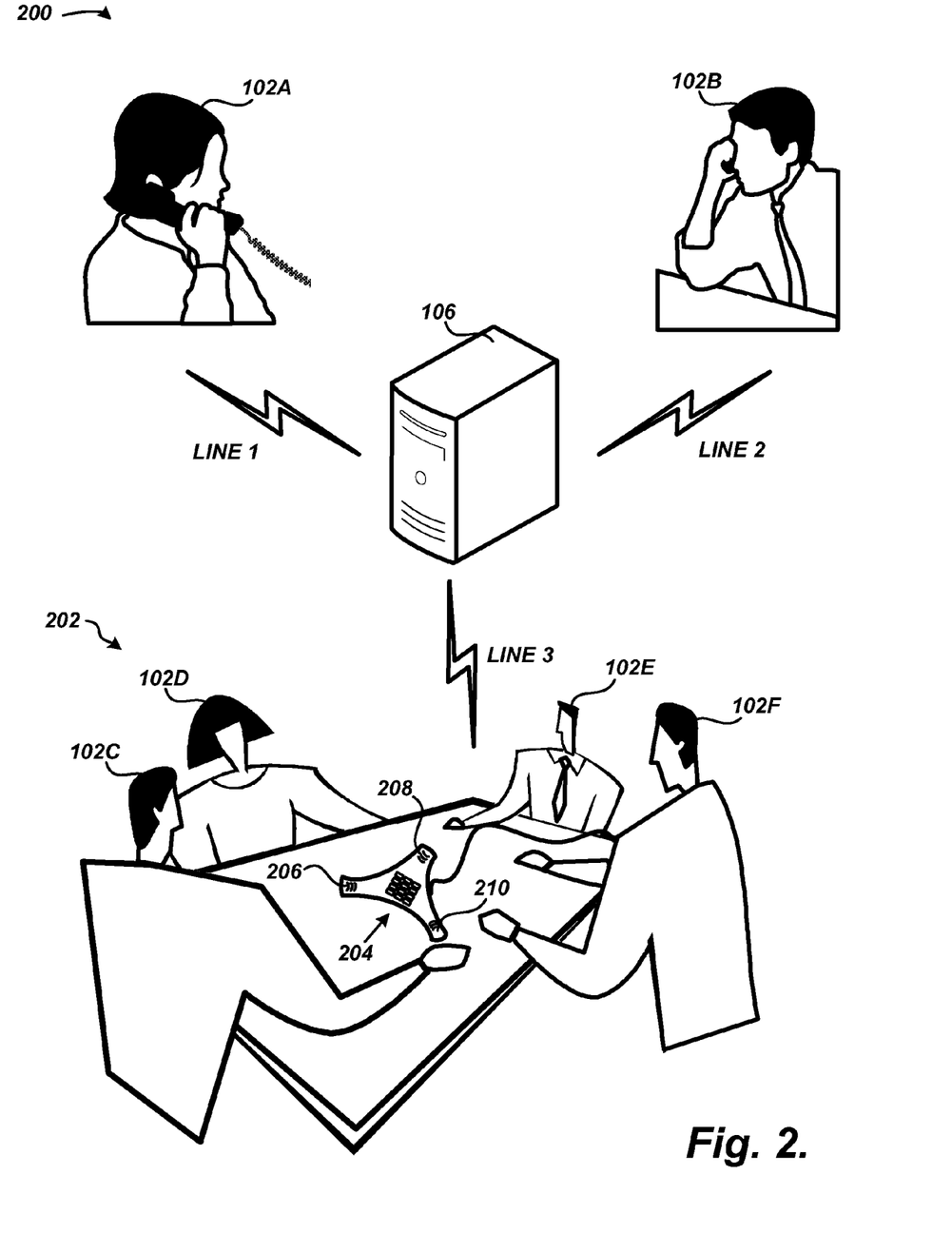
FIG. 2 is a pictorial diagram showing an illustrative example of applicable conference call components for managing conference call audio according to various embodiments presented herein.

Turning now to FIG. 2, an illustrative example of an audio environment 200 and examples of audio management techniques available according to various embodiments will be described. The audio environment 200 illustrates a real-time conference call between speakers 102A-102F, located at three separate locations. The speaker 102A is participating in the conference call from a first location via a telecommunications line 1. The speaker 102B is participating from a second location via a telecommunications line 2. The remaining speakers 102C-102F are co-located in a conference room 202 and are participating using a speaker phone 204 connected to the conversation via a telecommunications line 3.

It should be appreciated that the telecommunications lines 1, 2, and 3 may include wired or wireless connections, directly or indirectly, to the audio management server 106. The speaker phone 204 shown in the illustrative audio environment 200 includes three microphones 206, 208, and 210. Alternatively, the speaker phone 204 may be a conventional telephone that includes a single microphone, or may include any number of microphones. As will be described below, having multiple microphones 206, 208, and 210 improves the ability of the audio management engine 110 to determine the location of the speakers 102C-102F, and therefore the identity of the speakers 102C-102F, as each of them are speaking.

Throughout the various embodiments, the audio management engine 110 attempts to identify each of the speakers 102A-102F as they are speaking. Generally, the identification is performed by creating an unidentified voice print of the current speaker 102, and then comparing the created unidentified voice print to any number of identified voice prints 114. If a match is found, then the speaker 102 associated with the unidentified voice print is assigned the identity associated with the matching identified voice print 114. The creation of voice prints includes sampling the spoken audio of the speaker 102. From the sample, the audio management engine 110 utilizes known speech analysis tools to create the unidentified voice print. For example, as described briefly above, the audio management engine 110 may create a spectrogram for illustrating formants within the speech sample that are unique or common to the associated speaker 102. By comparing acoustic characteristics of the unidentified voice print to one or more identified voice prints 114, the audio management engine 110 can verify or determine the identity of the speaker 102.

According to one embodiment, the audio management engine 110 will first attempt to create identified voice prints 114 corresponding to each of the speakers 102A-102F to use in the identification of the current speaker 102 each time the current speaker 102 changes during the course of the conference call. To create the identified voice prints 114, speech samples are recorded from each of the speakers 102A-102F. These speech samples may be recorded the first time that a new speaker 102 is detected by the audio management engine 110. According to one embodiment, the audio management engine 110 prompts the speakers 102A-102F to identify themselves and to provide a speech sample prior to connecting the speaker 102 to the conference call.

For example, conference call systems often provide for multiple participants to call a single telephone number and input a code corresponding to the specific conference call in which they would like to participate. Before connecting each participant to the conference call, the system 100 will prompt the participant to identify himself or herself so that the participant may be announced when connected to the other participants. Using the embodiments described herein, the audio management engine 110 may additionally prompt each participant to repeat a test phrase that contains an appropriate combination of sounds to allow the audio management engine 110 to create the identified voice print 114 associated with the speaker 102.

In another embodiment in which the speakers 102A-102F are not prompted for identities and voice samples prior to being connected to the conference call, each of the speakers 102A-102F corresponds to a known or discovered telecommunications line and/or position within the conference room 202 with respect to one or more microphones 206, 208, and 210. With this information, each time the speaker 102 changes during the conference call, the audio management engine 110 creates an unidentified voice print and compares the unidentified voice print to the identified voice print 114 associated with telecommunications line and/or position within the conference room 202 of the current speaker 102 to confirm the identity of the current speaker 102. According to embodiments in which the speakers 102A-102F are not associated with a particular telecommunications line 1, 2, or 3, or associated with a particular position within the conference room 202, then the unidentified voice prints are compared to all of the identified voice prints 114 stored within the audio repository 108, or to any smaller sample of the identified voice prints 114 as possible.

As another example, looking at FIG. 2, assume the current speaker 102 changes from the speaker 102B, identified as John Smith, to the speaker 102A associated with telecommunications line 1. As a result, the audio management engine 110 creates the unidentified voice print associated with the new audio. Because the audio management engine 110 has previously identified the speaker 102A associated with telecommunications line 1 as Sally Jones (via voice sampling and identification prompting when Sally joined the conference call), and because the new audio is originating from the telecommunications line 1, the audio management engine 110 compares the unidentified voice print to the identified voice print 114 associated with Sally Jones to confirm the identity of the new speaker 102A as Sally Jones.

It should be appreciated that comparing the unidentified voice print with a single identified voice print 114, or with as small a sample of identified voice prints 114 as possible, is beneficial because it decreases the processing time required for the audio management engine 110 to perform the analysis. Consequently, as mentioned above, the audio management engine 110 compares the unidentified voice print associated with the new speaker 102 to the identified voice print 114 associated with the particular telecommunications line 1, 2, or 3 that is the source of the new audio. However, when the telecommunications line 3 is associated with multiple speakers 102C-102F, then the audio management engine 110 may additionally attempt to narrow down the sample of identified voice prints 114 to which the unidentified voice print must be compared by detecting the location of the new speaker 102 in the conference room 202 and comparing the unidentified voice print of the new speaker 102 to only those identified voice prints 114 associated with speakers 102 located proximate to the new speaker's 102 location.

Figure 3:
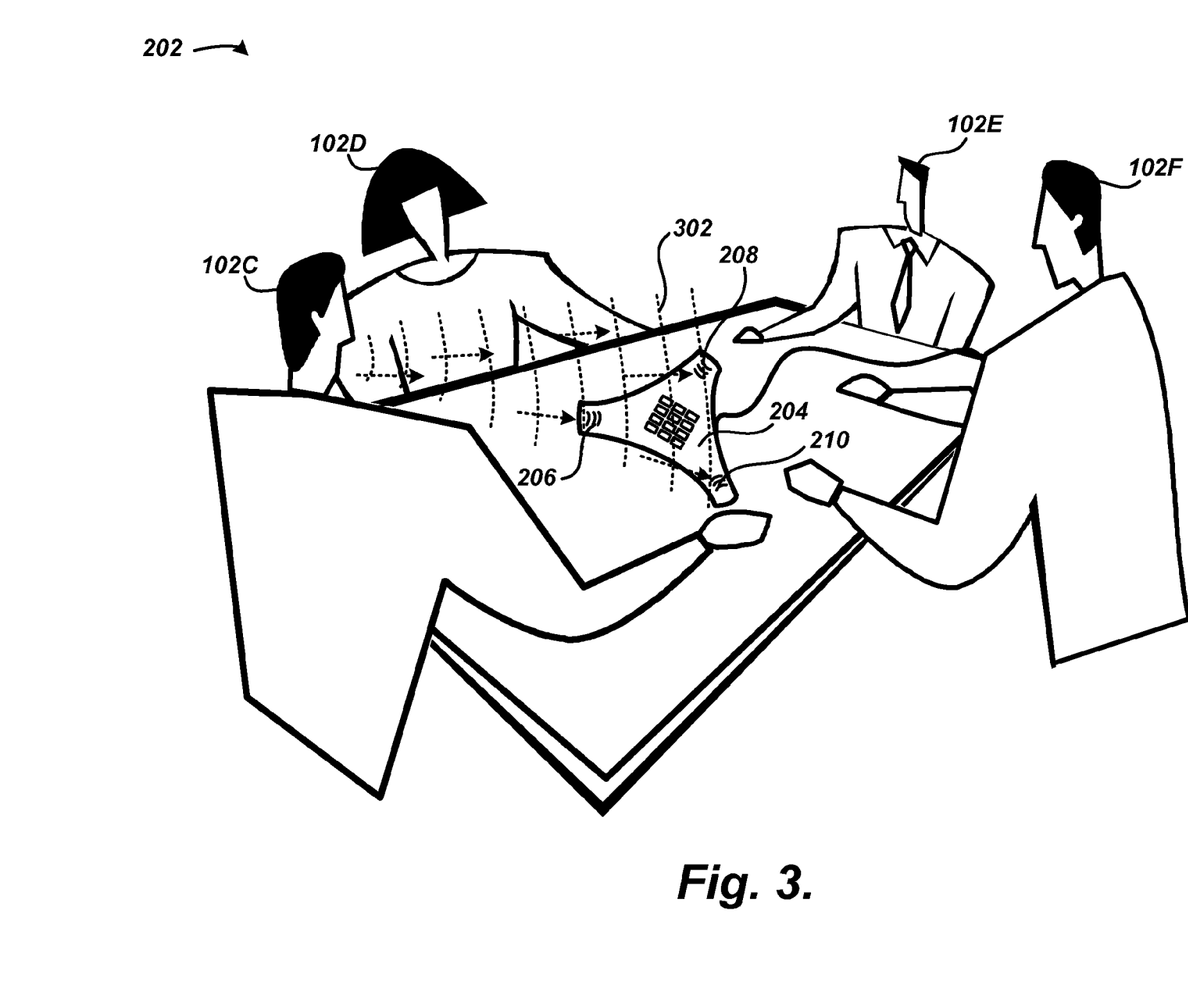
FIG. 3 is a pictorial diagram showing an illustrative example of an audio source detection system according to various embodiments presented herein.

Turning now to FIG. 3, an example showing how the audio management engine 110 detects a direction of the speaker 102 with respect to the speaker phone 204 according to one embodiment will be described. The speakers 102C-102F are seated around a table within the conference room 202. The speaker 102C is currently speaking, creating a sound wave 302. The dotted arrows represent the direction that the sound wave 302 is traveling. Each of the microphones 206, 208, and 210 are operative to detect the pressure associated with the initial contact with the sound wave 302. The position on each microphone at which the initial contact is detected indicates the direction of the speaker 102C that created the sound wave 302. Additional methods for detecting the location or vicinity of each of the speakers 102C-102F may be used by the audio management engine 110.

According to another embodiment, the time of the initial receipt of the sound wave 302 at each of the microphones 206, 208, and 210 is determined and compared to calculate the order in which the microphones 206, 208, and 210 received the corresponding audio. The resulting order may be used to determine the proximity of the new speaker 102 to each of the microphones 206, 208, and 210, and therefore narrow down the general direction in which the new speaker 102 is located with respect to the speaker phone 204. As an example, because the microphone 206 receives the sound wave 302 prior to the microphones 208 and 210, then the audio management engine 110 may determine that the new speaker 102 is to the left of the speaker phone 204 as viewed in FIG. 2, and will then compare the corresponding unidentified voice print to the identified voice prints 114 associated with the speakers 102C and 102D that are located to the left of the speaker phone 204, without having to compare the unidentified voice print to the identified voice prints 114 associated with the speakers 102E and 102F. It should be appreciated that any number of microphones may be positioned at multiple locations throughout the conference room 202. The greater the number of microphones, and the greater the distance apart from one another, the greater the accuracy of the location of the speaker 102 will be.

Figure 4:
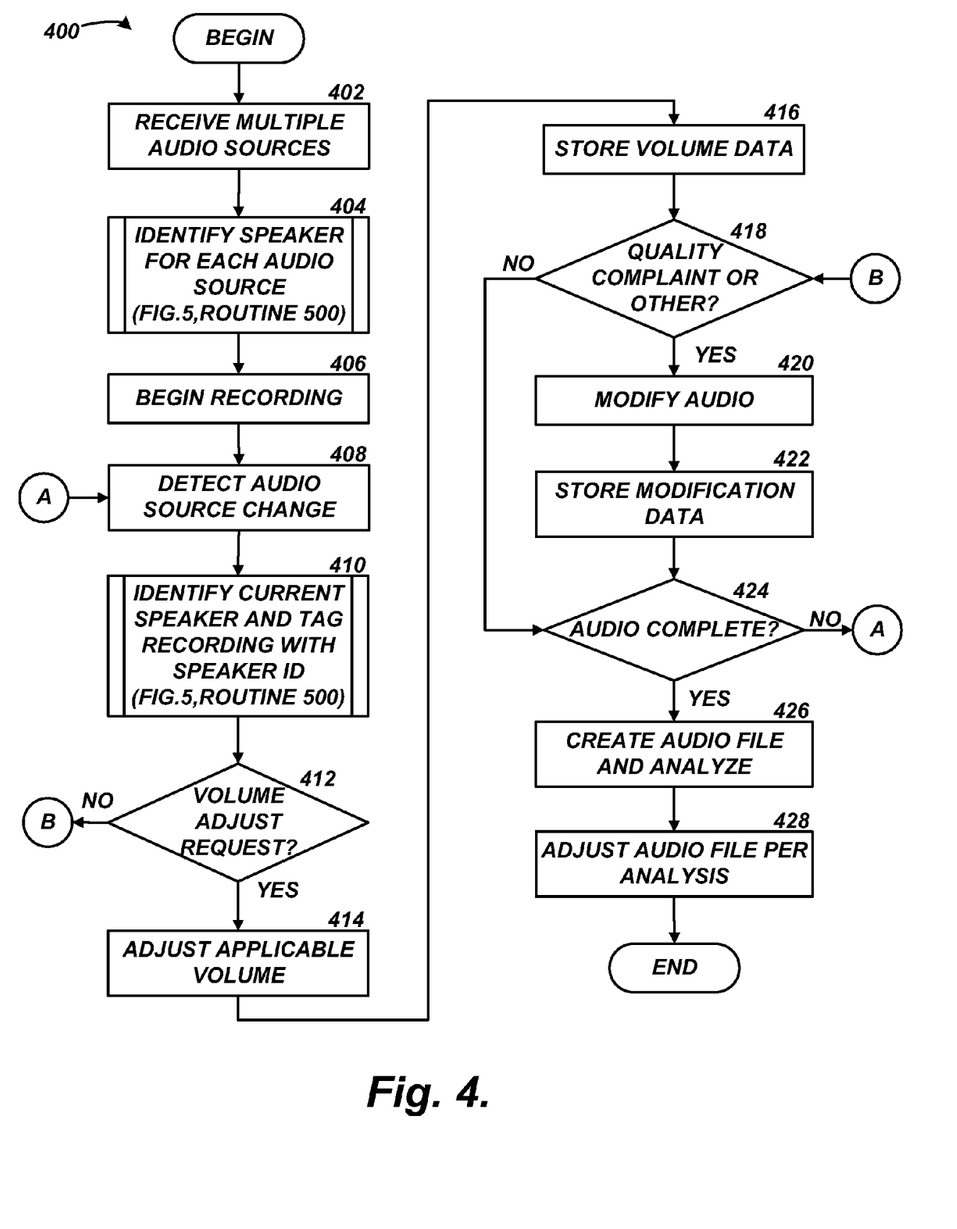
FIG. 4 is a flow diagram illustrating a method for managing audio content according to various embodiments presented herein.

Turning now to FIG. 4, an illustrative routine 400 will be described for managing audio from multiple audio sources according to various embodiments presented herein. The routine 400 will be described with respect to the audio environment 200 shown in FIG. 2. It should be appreciated that the logical operations described herein are implemented (1) as a sequence of computer implemented acts or program modules running on the audio management server 106 and/or (2) as interconnected machine logic circuits or circuit modules within the audio management server 106. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

Figure 5:
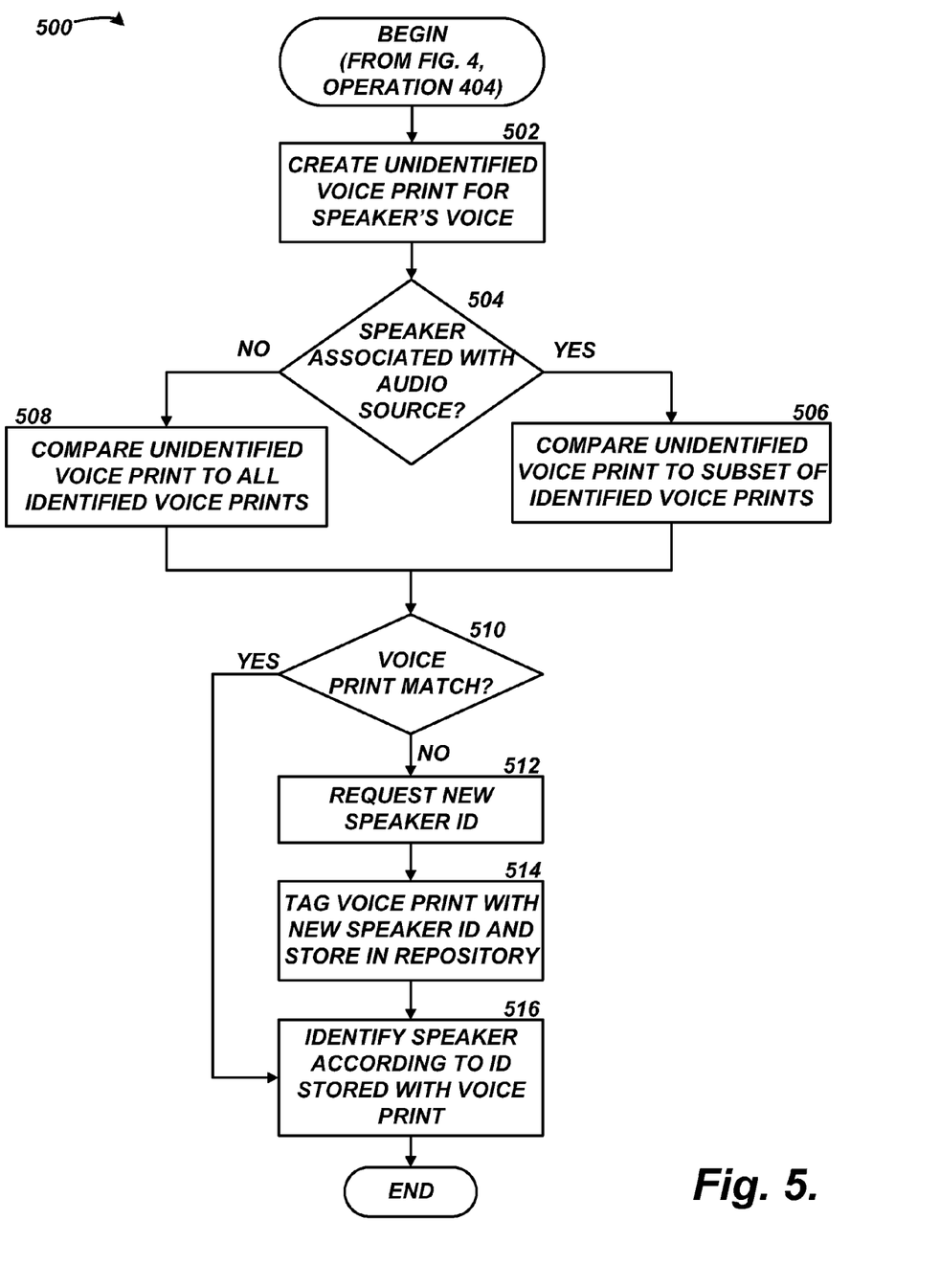
FIG. 5 is a flow diagram illustrating a method for identifying a speaker for each audio source according to various embodiments presented herein.

The routine 400 begins at operation 402, where the audio management engine 110 receives multiple audio sources. In this example, the multiple audio sources include the telecommunications lines 1, 2, and 3, as well as the locations of the speakers 102C-102F utilizing the telecommunications line 3. From operation 402, the routine 400 continues to operation 404, where the audio management engine 110 identifies the speakers 102A-102F for each audio source. FIG. 5 illustrates a sub-routine 500 for identifying the speakers 102A-102F according to one embodiment. It should be appreciated that the sub-routine 500 may be used by the audio management engine 110 to identify the speakers 102A-102F early in the conference call and to create identified voice prints 114 associated with the speakers 102A-102F for comparison to unidentified voice prints associated with the current speaker 102 when the current speaker 102 in the conversation changes.

The sub-routine 500 begins at operation 502, where the audio management engine 110 creates an unidentified voice print corresponding to the speaker 102 at a particular audio source. From operation 502, the sub-routine 500 continues to operation 504, where the audio management engine 110 determines whether there is an identified speaker 102 associated with the telecommunications line 1, 2, or 3 or location within the conference room 202 from which the audio is being received. For example, the audio management engine 110 may determine that the telephone number from which the speaker 102B is calling from is associated with John Smith. The telephone number may be obtained through typical caller ID methods associated with a calling party. A contact list of speakers 102 associated with known telephone numbers or calling device identifiers may be stored with the management files 118 or elsewhere in the audio repository 108 and referenced by the audio management engine 110 when the telecommunications lines 1, 2, and 3, are established.

If there is an identified speaker 102 associated with the audio source, then the sub-routine 500 proceeds to operation 506, where the audio management engine 110 compares the unidentified voice print to an applicable subset of identified voice prints 114. For example, if the audio corresponding to the unidentified voice print originates from the telecommunications line 2, then the audio management engine 110 can determine via caller ID or via information stored in the audio repository 108 that John Smith is associated with the telecommunications line 2. Then the audio management engine 110 will retrieve the identified voice print 114 associated with John Smith, if any, and will compare the unidentified voice print to the identified voice print 114 corresponding to John Smith to verify that the unidentified voice print belongs to John Smith. In this manner, the audio management engine 110 does not have to compare the unidentified voice print to all of the identified voice prints 114 stored in the audio repository 108 to find a match. From operation 506, the sub-routine 500 continues to operation 510 and proceeds as described below.

However, if at operation 504, the audio management engine 110 determines that there is not a speaker 102 associated with the audio source, then the sub-routine 500 proceeds to operation 508, where the audio management engine 110 compares the unidentified voice print to all of the identified voice prints 114 stored in the audio repository 108. The sub-routine 500 continues from operation 508 to operation 510, where the audio management engine 110 determines whether the unidentified voice print matches any of the identified voice prints 114 to which it is compared. If a match is found, then the sub-routine 500 proceeds to operation 516, where the audio management engine 110 identifies the speaker 102 associated with the unidentified voice print according to the identification of the speaker 102 of the matching identified voice print 114 and the sub-routine 500 ends and returns to the routine 400.

However, if the audio management engine 110 determines at operation 510 that the unidentified voice print does not match an identified voice print 114, then the sub-routine 500 continues to operation 512, where the audio management engine 110 requests a new speaker identification corresponding to the speaker 102. The audio management engine 110 may prompt the speaker 102 for an identification or may assign an identification such as "Speaker 1." From operation 512, the sub-routine 500 continues to operation 514, where the audio management engine 110 tags the unidentified voice print with the new speaker identification to create an identified voice print 114, and stores the identified voice print 114 in the audio repository 108. Tagging the unidentified voice print may include inserting one or more descriptors into the unidentified voice print that identify the associated speaker 102. The sub-routine continues to operation 516, where the audio management engine 110 identifies the speaker 102 associated with the audio source according to the identification of the speaker 102 associated with the identified voice print 114. From operation 516, the sub-routine 500 ends and returns to the routine 400.

Returning to FIG. 4, the routine 400 continues from operation 404 to operation 406, where the audio management engine 110 begins recording the audio to create the audio file 116. From operation 406, the routine 400 continues to operation 408, where the audio management engine 110 detects a change in audio sources. For example, the speaker 102B may stop talking and the speaker 102A may begin talking. This change may be detected through continuous analysis of the voice characteristics of the current speaker 102, through detecting pauses and subsequent continuations in the audio, or by detecting a change in the audio from one telecommunications line to another or from one location in the conference room 202 to another, among other known methods for detecting changes in audio.

The routine 400 continues from operation 408 to operation 410, where the audio management engine 110 identifies the current speaker 102 as described above with respect to the sub-routine 500, and then tags the audio recording with the current speaker identification. By placing tags or descriptors within the audio recording at the location in the recording in which the speaker 102 changes, the audio search engine 112 may be used to search for a portion of the resulting audio file 116 attributed to a particular speaker 102. According to various embodiments, in addition to placing tags or descriptors within the audio recording when the speaker 102 changes, the audio management engine 110 may send an icon, avatar, photograph, text, or any other visual and/or audible identifiers to one or more of the communications devices 104 for display or playback to the corresponding speakers 102. From operation 410, the routine 400 continues to operation 412, where the audio management engine 110 determines whether one or more speakers 102 have requested an adjustment to the volume of one or more of the audio sources.

According to embodiments described herein, the audio management engine 110 may receive feedback from the speakers 102A-102F during the conference call. As a result, the audio management engine 110 makes adjustments to all or portions of the audio. The feedback may be provided by the speakers 102A-102F using a key press or combination of key presses on the applicable communications device 104. At operation 412, the audio management engine 110 determines whether a volume adjustment request has been received. According to one embodiment, the speakers 102A-102F may press a key on the corresponding communications device 104 to adjust the volume of the audio associated with the current speaker 102.

For example, assume the speaker 102B is having difficulty hearing the speaker 102A. The difficulty may be due to the low volume of the associated speech, due to problems with telecommunications line 1 associated with the speaker 102A, or due to problems with telecommunications line 2 associated with the speaker 102B. In any case, the speaker 102B may press #2 on his telephone corresponding to a request to increase the volume of the incoming audio from the speaker 102A. If it is necessary to reduce the volume of the incoming audio from the speaker 102A, the speaker 102B may press #0. The audio management engine 110 may respond to the feedback by increasing the incoming audio volume on the telecommunications line 2 whenever the audio management engine 110 detects that the speaker 102A is the current speaker 102.

Alternatively, the audio management engine 110 may instruct the communications device 104 corresponding to the speaker 102B to adjust the volume of the incoming audio whenever the audio management engine 110 detects that the speaker 102A is the current speaker 102. As will be described below, the volume adjustment request may be stored and if a threshold number of speakers 102 from the total number of speakers 102A-102F participating in the conference call request that the volume of the audio from the speaker 102A be increased, the audio management engine 110 will increase the volume of all audio originating with telecommunications line 1, or of all audio associated with the speaker 102A in the current, or even future, conference calls.

Returning to FIG. 4, if the audio management engine 110 does not receive a request to adjust the volume of one or more audio sources at operation 412, then the routine 400 proceeds to operation 418 and continues as described below. However, if at operation 412, the audio management engine 110 determines that a volume adjustment request has been received, then the routine 400 continues to operation 414, where the audio management engine 110 adjusts the applicable volume level and then data corresponding to the volume adjustment is stored with the management files 118 in the audio repository 108 at operation 416 for tracking and management purposes. From operation 416, the routine 400 continues to operation 418, where the audio management engine 110 determines whether one or more speakers 102 have requested an adjustment to the quality of one or more of the audio sources or provided any further feedback.

Similar to the volume adjustment request described above, embodiments described herein allow for the speakers 102A-102F to provide virtually any type of feedback corresponding to the audio and/or another speaker 102. As an example, the speakers 102A and 102B may have difficulty hearing the speakers 102C-102F because of quality issues with the telecommunications line 3. The audio management engine 110 receives a particular key press or combination of key presses from the speakers 102A and 102B corresponding to poor audio quality when the current speaker 102 is one of the speakers 102C-102F in the conference room 202. For example, the speakers 102A and 102B may both press #1 on their respective telephones to indicate poor audio quality when receiving audio from the conference room 202. As a result, the audio management engine 110 applies quality control techniques, such as the using audio filters, aural exciters, amplifiers, as well as any other noise cancellation techniques, to the audio from the telecommunications line 3.

Other feedback may include information requests. For example, a particular key on the communications devices 104A-104N associated with the speakers 102A-102F may be pressed to request the identity of the current speaker 102. For example, when #3 is pressed, the audio management engine 110 determines the identity of the current speaker 102 through methods described above, and returns the identity to the requesting speaker 102. The identity may be displayed on a display of the communications device 104 associated with the requesting speaker 102 in the form of a photograph, an icon, an avatar, a name, an identifying number, or a combination thereof. Alternatively, the identity of the current speaker 102 may be audibly stated via the communications device 104. Keys on the communications devices 104A-104N may also be programmed to provide any type of real-time statistics regarding the current conference call. Examples include but are not limited to pressing #4 for statistics regarding the speaker 102 that has spoken the most times, #5 for the speaker 102 that has spoken for the longest duration, and #6 for the speaker 102 that has participated the least, among others.

At operation 418, if the audio management engine 110 determines that a quality complaint or other feedback has not been received, then the routine 400 proceeds to operation 424 and continues as described below. However, if at operation 418, the audio management engine 110 determines that a quality complaint or other feedback has been received, then the routine 400 continues to operation 420, and the audio management engine 110 modifies the audio or otherwise responds to the feedback as applicable. At operation 422, the data regarding the modification is stored with the management files 118 or the audio repository 108 to be used for tracking and management purposes.

From operation 422, the routine 400 continues to operation 424, where the audio management engine 110 determines if the audio is complete. If the audio is not complete and the conference call continues, then the routine 400 returns to operation 408 and continues as described above. However, if the audio is complete and the conference call has ended, then the routine 400 continues from operation 424 to operation 426, where the audio management engine 110 stores the audio recording as an audio file 116 in the audio repository 108. Additionally, the audio management engine 110 may further analyze the recording to determine how, if at all, the audio was modified during the conference call and to make any necessary adjustments to the corresponding audio file 116.

For example, the audio management engine 110 analyzes the audio recording and determines from inserted metadata that there were two requests during the conference call that the volume associated with the speaker 102A be increased. Further, the audio management engine 110 determines that the speakers 102A and 102B both submitted feedback during the conference call corresponding to poor audio quality with respect to the telecommunications line 3. The audio management engine 110 may determine that all audio associated with the speaker 102A should be amplified in the current recording, in stored audio files 116, and/or in future conference calls and audio in which the speaker 102A is a participant. Similarly, the audio management engine 110 may search the audio repository 108 for descriptors within the audio files 116 corresponding to the conference room 202 as an audio source. The audio management engine 110 may then determine whether similar complaints have been made regarding the audio quality relating to the conference room 202. If a threshold number of complaints have been made, then the audio management engine 110 may retroactively modify all of the applicable audio files 116 to improve the quality of the portions of the audio corresponding to audio from the conference room 202.

The audio management engine 110 may further use the analysis to calculate statistics with respect to the audio and the corresponding speakers 102A-102F. For example, as described briefly above, the audio management engine 110 may track how many times each speaker 102 talks, the duration time that each speaker 102 talks for the entire conference call, or any other statistical data that may be tracked and that may be useful in creating reports and metrics. This statistical data, and any subsequent reports and metrics may be stored in the management files 118 of the audio repository 108. Returning to FIG. 4, the routine 400 continues from operation 426 to operation 428, where the audio management engine 110 adjusts the audio file 116 of the conference call as applicable per the analysis described above and the routine 400 ends.

Figure 6:
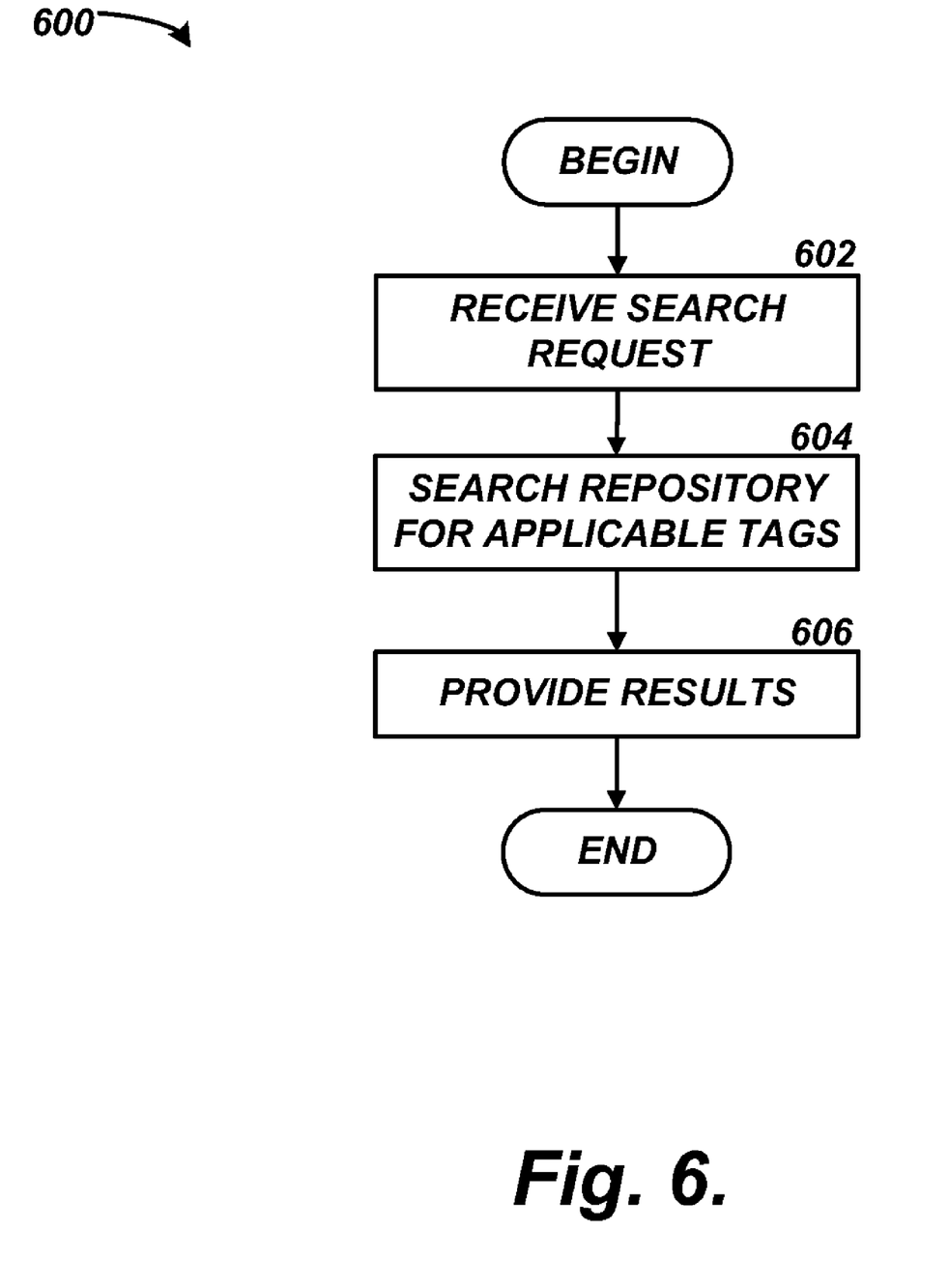
FIG. 6 is a flow diagram illustrating a method for searching for an audio file or a portion of an audio file according to various embodiments presented herein.

Turning now to FIG. 6, an illustrative routine 600 for searching for audio files 116 or portions of audio files 116 will be described. As described briefly above, embodiments of the disclosure presented herein allow for searches for applicable portions of audio files 116. To locate the desired portions of the audio files 116, the audio search engine 112 may search for the applicable descriptors inserted into the audio files 116 by the audio management engine 110.

For example, using the embodiments described herein, a user may search the audio repository 108 for all audio files 116 in which the speaker 102B was a participant. The audio search engine 112 will search the audio files 116 for a descriptor corresponding to the speaker 102B. The audio search engine 112 may then provide a list of audio files 116 containing the descriptor corresponding to the speaker 102B and retrieve any selected audio files 116 or even the applicable portions of the audio files 116. It should be appreciated that any number and type of descriptors may be inserted into the audio files 116 by the audio management engine 110 during or after the audio files 116 were recorded. The descriptors may then be used by the audio management engine 110 to calculate statistical data and corresponding metrics, and by the audio search engine 112 to retrieve specific data.

The routine 600 begins at operation 602, where the audio search engine 112 determines that a search request has been received. From operation 602, the routine 600 continues to operation 604, where the audio search engine 112 searches the audio repository 108, including all tags and metadata within the audio files 116, for the audio files 116 corresponding to the requested search terms. The results are provided at operation 606, and the routine 600 ends. It should be understood that during subsequent playback of the requested audio files 116 or portions of audio files 116, information corresponding to the descriptors, tags and any other metadata may be presented to the user according to the capabilities of the communications device 104 associated with the user. Using the above example, when the user plays back the audio files 116 that were retrieved by the audio search engine 112, the user may see a visual indication such as an icon, avatar, or photo representing the speaker 102B whenever the speaker 102B is speaking.

Figure 7:
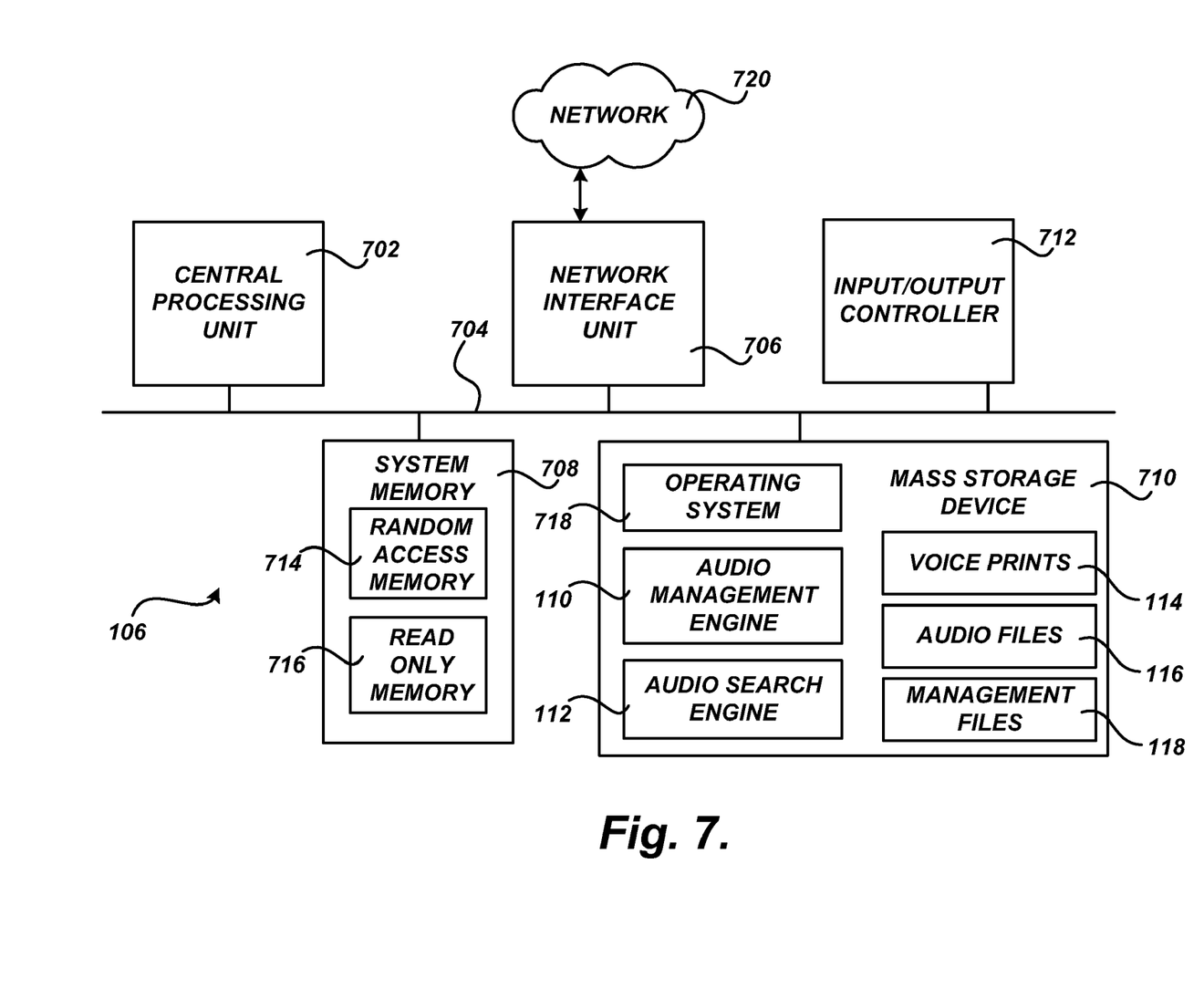
FIG. 7 is a computer architecture diagram showing a computer architecture suitable for implementing the various computer systems described herein.

Referring now to FIG. 7, an illustrative computer architecture for the audio management server 106 utilized in the various embodiments presented herein will be discussed. The computer architecture shown in FIG. 7 illustrates a conventional desktop, laptop computer, or server computer. Specifically, the audio management server 106 illustrates the computer architecture associated with the audio management server 106, but the architecture may also apply to the communication devices 104 in a distributed architecture. The computer architecture shown in FIG. 7 includes a central processing unit 702 (CPU), a system memory 708, including a random access memory (RAM) 714 and a read-only memory (ROM) 716, and a system bus 704 that couples the memory to the CPU 702. A basic input/output system (BIOS) containing the basic routines that help to transfer information between elements within the audio management server 106, such as during startup, is stored in the ROM 716. The audio management server 106 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the audio management server 106. Although the description of computer-readable media contained herein refers to a mass storage device, such as a hard disk or CD-ROM drive, it should be appreciated by those skilled in the art that computer-readable media can be any available media that can be accessed by the audio management server 106.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the audio management server 106.

According to various embodiments, the audio management server 106 may operate in a networked environment using logical connections to remote computers through the network 720. As described above with respect to FIG. 1, the network 720 may include a wireless network such as, but not limited to, a WLAN such as a WI-FI network, a WWAN, a WPAN such as BLUETOOTH, a WMAN such a WiMAX network, a cellular network, or a satellite network. The network 720 may also be a wired network such as, but not limited to, a wired WAN, a wired LAN such as the Ethernet, a wired PAN, or a wired MAN. The network 720 may include the Internet such that the elements of the audio management system 100 communicate with one another via wireless or wired connections to the Internet. Through the network 720, the audio management server 106 may connect with the communication devices 104, including the various lines.

The audio management server 106 may connect to the network 720 through a network interface unit 706 connected to the bus 704. It should be appreciated that the network interface unit 706 may also be utilized to connect to other types of networks and remote computer systems. The audio management server 106 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the audio management server 106, including the operating system 718 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 710 and RAM 714 may also store one or more program modules. In particular, the mass storage device 710 and the RAM 714 may store the audio management engine 110, the audio search engine 112, the voice prints 114, the audio files 116, and the management files 118, as well as any other program modules described above with respect to FIG. 1. Based on the foregoing, it should be appreciated that apparatus, systems, methods, and computer-readable media for managing audio in a multi-source audio environment are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for managing real-time audio from a multi-source audio environment, the computer-implemented method comprising computer-implemented operations for:
   receiving the real-time audio comprising a plurality of audio sources;
   identifying a plurality of speakers, each of which is associated with one of the plurality of audio sources;
   detecting an audio source change from a first audio source of the plurality of audio sources to a second audio source of the plurality of audio sources;
   in response to detecting the audio source change, providing an identification of a first speaker of the plurality of speakers, the first speaker being associated with the second audio source;
   receiving feedback corresponding to one of the plurality of audio sources from a second speaker associated with one of the plurality of audio sources;
   recording the real-time audio to create an audio recording;
   after recording of the real-time audio has completed, determining whether a threshold quantity of feedback was received during the recording of the real-time audio;
   if the threshold quantity of feedback was received during the recording of the real-time audio, modifying the audio recording according to the feedback to create a modified audio recording, and storing the modified audio recording in a repository; and
   if the threshold quantity of feedback was not received during the recording of the real-time audio, storing the audio recording in the repository.

2. The method of claim 1, wherein providing the identification of the first speaker associated with the second audio source comprises inserting a descriptor corresponding to the first speaker associated with the second audio source into the recording of the real-time audio.

3. The method of claim 2, further comprising:
   receiving a request to search the repository for audio recordings comprising the descriptor corresponding to the first speaker associated with the second audio source;
   searching the repository for the descriptor corresponding to the first speaker associated with the second audio source; and
   providing a list comprising an identification of audio recordings stored within the repository comprising the descriptor corresponding to the first speaker associated with the second audio source.

4. The method of claim 1, wherein providing the identification of the first speaker associated with the second audio source comprises providing the identification of the first speaker associated with the second audio source to a third speaker associated with one of the plurality of audio sources other than the second audio source.

5. The method of claim 1, wherein identifying the plurality of speakers, each of which is associated with one of the plurality of audio sources comprises:
   creating an unidentified voice print for each speaker of the plurality of speakers;
   comparing the unidentified voice print for each speaker of the plurality of speakers to at least one identified voice print stored in the repository;
   if a match between one of the unidentified voice prints and one of the plurality of speakers is discovered, identifying a particular speaker of the plurality of speakers associated with the match as corresponding to a matched unidentified voice print; and
   if a match between one of the unidentified voice prints and one of the plurality of speakers is not discovered, assigning an identity to an unmatched unidentified voice print.

6. The method of claim 5, further comprising selecting a particular identified voice print of the at least one identified voice prints stored in the repository for comparison according to one of the following: a telephone number and an Internet Protocol address associated with each unidentified voice print.

7. The method of claim 1, wherein the feedback comprises an identification of a key press on a communications device corresponding to a request for increasing a volume of the one of the plurality of audio sources.

8. The method of claim 1, wherein the feedback comprises an identification of a key press on a communications device corresponding to a request for an improvement of audio quality of the one of the plurality of audio sources.

9. The method of claim 1, wherein one of the plurality of audio sources is associated with a subset of the plurality of speakers, the subset of the plurality of speakers comprising at least two speakers, and wherein identifying the plurality of speakers, each of which is associated with one of the plurality of audio sources comprises distinguishing between individual speakers of the subset of the plurality of speakers associated with the one of the plurality of audio sources according to a position of each of the individual speakers of the subset of the plurality of speakers with respect to at least one microphone receiving the real-time audio.

10. The method of claim 9, wherein distinguishing between the individual speakers of the subset of the plurality of speakers associated with the one of the plurality of audio sources according to the position of each of the individual speakers of the subset of the plurality of speakers with respect to the at least one microphone receiving the real-time audio comprises:
  detecting a sound wave at a position on each of the at least one microphone; and
  assigning a speaker identification to a source of each sound wave according to the position on each of the at least one microphone in which the sound wave is detected.

11. A non-transitory computer-readable medium having computer-executable instructions stored thereon which, when executed by a computer, cause the computer at least to:
  receive real-time audio comprising a plurality of audio sources;
  identify a plurality of speakers, each of which is associated with one of the plurality of audio sources;
  detect an audio source change from a first audio source of the plurality of audio sources to a second audio source of the plurality of audio sources;
  in response to detecting the audio source change, provide an identification of a first speaker of the plurality of speakers, the first speaker being associated with the second audio source;
  receive feedback corresponding to one of the plurality of audio sources from a second speaker associated with at least one of the plurality of audio sources;
  record the real-time audio to create an audio recording;
  after recording of the real-time audio has completed, determine whether a threshold quantity of feedback was received during the recording of the real-time audio;
  if the threshold quantity of feedback was received during the recording of the real-time audio, modify the audio recording according to the feedback to create a modified audio recording, and storing the modified audio recording in a repository; and
  if the threshold quantity of feedback was not received during the recording of the real-time audio, store the audio recording in the repository.

12. The computer-readable medium of claim 11, wherein the computer-executable instructions stored thereon which, when executed by the computer, cause the computer at least to cause the computer to provide the identification of the first speaker associated with the second audio source comprise computer-executable instructions stored thereon which, when executed by the computer, cause the computer to cause the computer at least to insert a descriptor corresponding to the first speaker associated with the second audio source into the recording of the real-time audio.

13. The computer-readable medium of claim 12, further comprising computer-executable instructions stored thereon which, when executed by the computer, cause the computer to:
  receive a request to search the repository for audio recordings comprising the descriptor corresponding to the first speaker associated with the second audio source;
  search the repository for the descriptor corresponding to the first speaker associated with the second audio source; and
  provide a list comprising an identification of audio recordings stored within the repository comprising the descriptor corresponding to the first speaker associated with the second audio source.

14. The computer-readable medium of claim 11, wherein the computer-executable instructions stored thereon which, when executed by the computer, cause the computer at least to identify the plurality of speakers, each of which is associated with one of the plurality of audio sources comprise computer-executable instructions stored thereon which, when executed by the computer, cause the computer to cause the computer at least to:
  create an unidentified voice print for each speaker of the plurality of speakers;
  compare the unidentified voice print for each speaker of the plurality of speakers to at least one identified voice print stored in the repository;
  if a match between one of the unidentified voice prints and one of the plurality of speakers is discovered, identify a particular speaker of the plurality of speakers associated with the match as corresponding to a matched unidentified voice print; and
  if a match between one of the unidentified voice prints and one of the plurality of speakers is not discovered, assign an identity to an unmatched unidentified voice print.

15. A system for managing real-time audio from a multi-source audio environment, the system comprising:
  a repository; and
  an audio management server computer, the audio management server computer comprising an audio management engine configured to:
    receive the real-time audio comprising a plurality of audio sources;
    identify a plurality of speakers, each of which is associated with one of the plurality of audio sources;
    detect an audio source change from a first audio source of the plurality of audio sources to a second audio source of the plurality of audio sources;
    in response to detecting the audio source change, provide an identification of a first speaker of the plurality of speakers, the first speaker being associated with the second audio source;
    receive feedback corresponding to one of the plurality of audio sources from a second speaker associated with at least one of the plurality of audio sources;
    record the real-time audio to create an audio recording;
    after recording of the real-time audio has completed, determine whether a threshold quantity of feedback was received during the recording of the real-time audio;
    if the threshold quantity of feedback was received during the recording of the real-time audio, modify the audio recording according to the feedback to create a modified audio recording, and storing the modified audio recording in the repository; and
    if the threshold quantity of feedback was not received during the recording of the real-time audio, storing the audio recording in the repository.

16. The system of claim 15, wherein one of the plurality of audio sources is associated with a subset of the plurality of speakers, the subset of the plurality of speakers comprising at least two speakers, and wherein in being configured to identify the plurality of speakers, each of which is associated with one of the plurality of audio sources, the audio management server computer is configured to utilize at least one microphone each of which is configured to determine a direction of an audio source of the plurality of audio sources with respect to the microphone by detecting a direction of a sound wave associated with the audio source according to a portion of the microphone first exposed to the sound wave.

* * * * *